United States Patent
Soomro et al.

(10) Patent No.: US 7,245,592 B2
(45) Date of Patent: Jul. 17, 2007

(54) ALIGNING 802.11E HCF AND 802.11H TPC OPERATIONS

(75) Inventors: Amjad Soomro, Hopewell Junction, NY (US); Sunghyun Choi, Montvale, NJ (US); Javier del Prado Pavon, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 957 days.

(21) Appl. No.: 10/119,577

(22) Filed: Apr. 10, 2002

(65) Prior Publication Data

US 2003/0012165 A1  Jan. 16, 2003

Related U.S. Application Data

(60) Provisional application No. 60/303,966, filed on Jul. 9, 2001.

(51) Int. Cl.
G08C 17/00 (2006.01)
(52) U.S. Cl. .................................. 370/311; 455/522
(58) Field of Classification Search ................ 370/311; 455/522
See application file for complete search history.

(56) References Cited

U.S. PATENT DOCUMENTS

| 5,363,366 | A * | 11/1994 | Wisdom et al. ............ 370/245 |
| 6,925,286 | B1 * | 8/2005 | Kraiem et al. ............ 455/13.4 |
| 2002/0051462 | A1 * | 5/2002 | Ertel et al. .................. 370/442 |
| 2002/0058504 | A1 * | 5/2002 | Stanforth .................... 455/426 |
| 2002/0090966 | A1 * | 7/2002 | Hansen et al. ............. 455/522 |
| 2002/0172186 | A1 * | 11/2002 | Larsson ...................... 370/349 |
| 2003/0003905 | A1 * | 1/2003 | Shvodian .................... 455/423 |
| 2003/0179742 | A1 * | 9/2003 | Ogier et al. ................ 370/351 |
| 2003/0214928 | A1 * | 11/2003 | Chuah ......................... 370/336 |
| 2004/0009785 | A1 * | 1/2004 | Nelson et al. ............. 455/522 |
| 2005/0254475 | A1 * | 11/2005 | Kubler et al. ............. 370/338 |

* cited by examiner

Primary Examiner—Hassan Kizou
Assistant Examiner—Mohammad S. Adhami

(57) ABSTRACT

A granted TxOP holder transmits the first frame of a QSTA-to-QSTA communication at a power level sufficient to ensure correct reception by the destination and at least detection by the HC, and then, with exceptions, transmits subsequent frames at a power level merely sufficient to ensure correct reception by the destination, regardless of reception or detection by the HC. Subsequent frames that must be received by the HC, such as those changing the TC queue size or requesting extension of the current TxOP, are transmitted at a power sufficient to ensure reception by the HC as well as the destination, as are the last frame(s). The HC is constrained from reclaiming the channel unconditionally merely because of failure to detect activity, and recovery is limited to the TxOP holder.

21 Claims, 4 Drawing Sheets

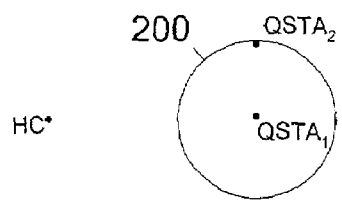
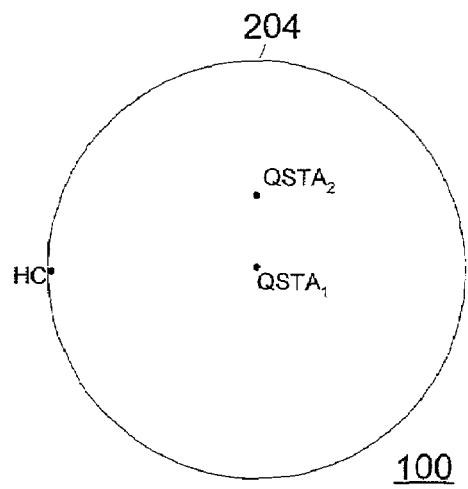
FIGURE 2B
FIGURE 2C
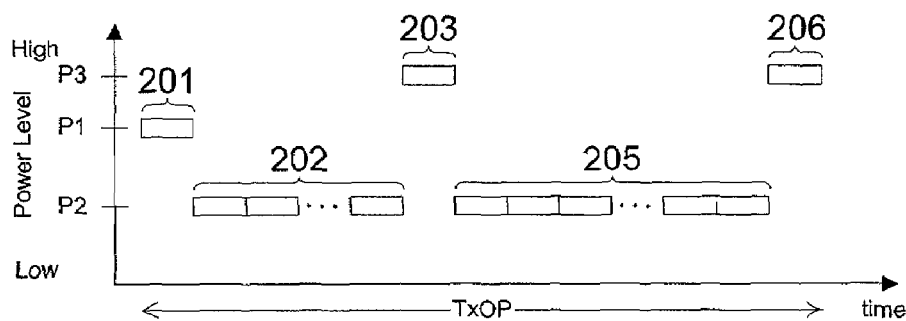
FIGURE 2D

ALIGNING 802.11E HCF AND 802.11H TPC OPERATIONS

CLAIM FOR PRIORITY

This application claims priority to U.S. provisional application Ser. No. 60/303,966 filed Jul. 9, 2001, which is incorporated herein by reference.

TECHNICAL FIELD OF THE INVENTION

The present invention is directed, in general, to wireless local area networks and, more specifically, to using transmit power control in conjunction with hybrid coordination function operation within wireless local area networks.

BACKGROUND OF THE INVENTION

Wireless local area networks (WLANs) are currently most commonly implemented according to the Institute of Electrical and Electronic Engineers (IEEE) 802.11-1999 standard, often referred to as "wireless fidelity" or "WiFi". A number of working groups are currently developing modifications and extensions to the standard for various purposes. In particular, the IEEE 802.11 Working Group's Medium Access Control (MAC) Enhancements task group (Task Group E) is working to incorporate quality of service (QoS) into wireless local area networks for high quality delivery of video, voice and multimedia (see IEEE 802.11e QoS draft D2.0a, November 2001), while the IEEE 802.11 Task Group H (TGh) is developing a standard for incorporation of dynamic frequency selection and transmit power control into IEEE 802.11a implementations (see "DFS and TPC Joint Proposal for 802.11h", IEEE 802.11-01/169r2).

Energy consumption has become an important issue in IEEE 802.11 wireless networks since mobile terminal battery life is limited. Energy conservation may be achieved in several ways, one of which is utilizing transmit power control (TPC), a mechanism reducing energy consumption and co-channel interference by adapting the radio transmit power to the minimum level required to achieve a desired link reliability (i.e., to guarantee correct reception of a frame). As noted above, the IEEE 802.11h Working Group is developing TPC for 802.11a, and similar algorithms are expected for the 802.11b physical (PHY) layer.

Use of the TPC mechanism in an IEEE 802.11e network operating under the hybrid coordination function (HCF) would be desirable, particularly since direct communication between quality-of-service (QoS) stations (QSTAs) without external control is permitted—that is, one QSTA can transmit to another without first transmitting to the access point/hybrid coordinator (AP/HC). Presumptively individual stations (STAs) would control transmit power during each contention-free period (CFP) and contention-free burst under the HCF operation.

Under one proposed implementation for the HCF, however, the hybrid coordinator (HC) must "hear" all frames in the CFB/CFP. Otherwise the HC, sensing the medium as idle for a distributed coordination function (DCF) inter-frame spacing (DIFS) period, will reclaim the channel and attempt to transmit. In addition, the HC needs to receive certain frames (e.g., to update queue sizes) for correct operation of the QoS-supporting basic service set (QBSS) network. Therefore every QSTA in a QBSS network should transmit every frame at a high enough power so that the HC can hear the frame, which considerably reduces the benefits of TPC. In QSTA-to-QSTA communications, the transmit power may not be as low as possible.

There is, therefore, a need in the art for improving the adaptation of transmit power control to hybrid coordination function operation under quality-of-service supporting basic service set networks.

SUMMARY OF THE INVENTION

To address the above-discussed deficiencies of the prior art, it is a primary object of the present invention to provide, for use in a quality-of-service supporting basic service set (QBSS) network, a granted TxOP holder which transmits the first frame of a QSTA-to-QSTA communication at a power level sufficient to ensure correct reception by the destination and at least detection by the HC, and then, with exceptions, transmits subsequent frames at a power level merely sufficient to ensure correct reception by the destination, regardless of reception or detection by the HC. Subsequent frames that must be received by the HC, such as those changing the TC queue size or requesting extension of the current TxOP, are transmitted at a power sufficient to ensure reception by the HC as well as the destination, as are the last frame(s). The HC is constrained from reclaiming the channel unconditionally merely because of failure to detect activity, and recovery is limited to the TxOP holder.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIGS. 2A–2D depict the structure and power level operation of a quality-of-service supporting basic service set (QBSS) wireless communications network implementing transmit power control and hybrid coordination function (HCF) operation according to one embodiment of the present invention;

DETAILED DESCRIPTION OF THE INVENTION

FIGS. 1A through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

Figure 1A:
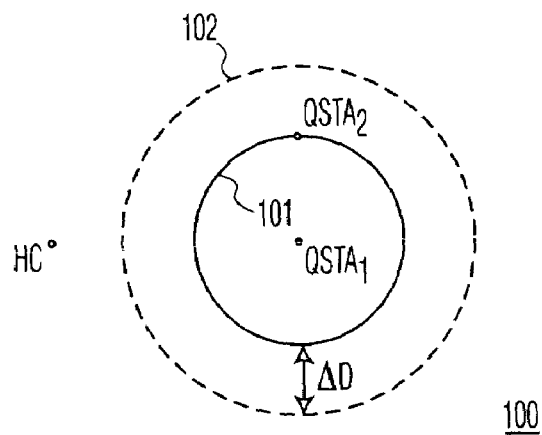
FIGS. 1A–1B depict quality-of-service supporting basic service set (QBSS) wireless communications networks under one set of proposed rules (IEEE 802.11e/D1.0) for hybrid coordination function (HCF) operation.
Figure 1B:
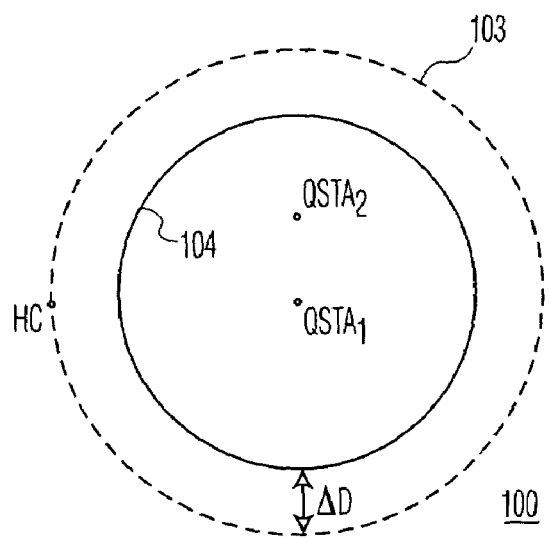

FIGS. 1A and 1B depict quality-of-service supporting basic service set (QBSS) wireless communications networks under currently proposed rules for hybrid coordination function (HCF) operation. Those skilled in the art will recognize that the full structure and operation of a wireless network is not depicted or described in complete detail. Instead, for simplicity and clarity, only so much of the known structure and operation of wireless networks as is unique to the present invention or necessary for an understanding of the present invention is depicted and described herein.

Under current rules of HCF operation, a transmission opportunity (TxOP) holder such as $QSTA_1$ needs to transmit frames at a sufficient power level to be received by the intended recipient $QSTA_2$ and at least heard (and preferably received) by the HC. The ideal case for TPC in QSTA-to-QSTA communication would be to set the transmit power level at $QSTA_1$ to the minimum level required to ensure reception of the transmitted frame at $QSTA_2$ (i.e., to ensure that $QSTA_2$ lies within the transmission range 101).

However, both the transmission range 101 and the clear channel assessment (CCA) busy range 102 are dependent on the transmit power, with a relatively constant incremental distance $\Delta D$ between the two. Therefore, as illustrated in FIG. 1A, the transmit power level that is sufficient to ensure reception of the transmitted frame at $QSTA_2$ may be insufficient to ensure that the transmission will be "heard" by the HC (i.e., that the HC lies within the CCA busy range 102). Thus, under current HC operation rules, the transmit power level at $QSTA_1$ must be set to the minimum level required to ensure that HC lies within the CCA busy range 103, even though the resulting transmission range 104 is greater than necessary to ensure reception by $QSTA_2$. As a result, the transmit power in QSTA-to-QSTA communications may not be as low as possible, resulting in inefficient use of power resources.

Figure 2A:
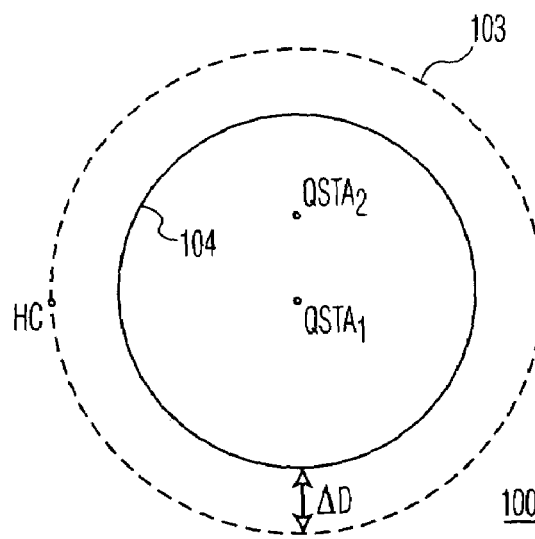

FIGS. 2A through 2D depict the structure and power level operation of a quality-of-service supporting basic service set (QBSS) wireless communications network implementing transmit power control and hybrid coordination function (HCF) operation according to one embodiment of the present invention. FIGS. 2A through 2C depict positions of QSTAs and HC and relative transmission and CCA busy ranges, while FIG. 2D depicts transmission power over time for a granted TxOP.

For the first frame 201 of QSTA-to-QSTA communications during a granted TxOP, the transmit power controller for the granted TxOP holder ($QSTA_1$ in the example shown) transmits at a sufficiently high power so that the intended recipient ($QSTA_2$ in the example) may correctly receive the frame 201 and the HC at least hears the frame. For the exemplary positions of $QSTA_1$, $QSTA_2$ and HC in FIGS. 1A and 1B, the power level P1 must be sufficient to cover the CCA busy range 103 and transmission range 104 as shown in FIG. 2A. The TxOP holder $QSTA_1$ uses the best power and data rate combination with this constraint, but the HC needs to hear the first frame to determine whether the polled QSTA received the QoS CF-polling frame correctly. Notably, if the HC is, at least as close to the TxOP holder $QSTA_1$ as the intended recipient $QSTA_2$, the power level P1 for the first frame need only be sufficient to ensure correct reception by the intended recipient $QSTA_2$.

Subsequent frames 202 for QSTA-to-QSTA communication during the TxOP, after the first frame 201, may be transmitted at a power level P2 (and data rate) selected by $QSTA_1$ solely to ensure correct reception of the frames 202 by the intended recipient (or destination) $QSTA_2$, without regard to whether the frames 202 are received or even heard by the HC. That is, the transmission power need only be sufficiently high to ensure that $QSTA_2$ lies within the transmission range 200 as shown in FIG. 2B.

During the TxOp, one or more selected frames 203 may optionally be transmitted by QSTA1 at a higher power level P3 (and selected data rate) sufficient to ensure that BOTH the destination QSTA within the QSTA-to-QSTA communication ($QSTA_2$) AND the HC correctly receive the frame (s) 203. For example, when the granted TXOP holder $QSTA_1$ desires to update the traffic category (TC) queue size, update the granted TxOP (i.e., request a new duration) or request a new TXOP, the transmit power controller for $QSTA_1$ transmits at the higher power level P3, corresponding to the transmission range 204 in FIG. 2C. Subsequent frames 205 within the TxOP are again transmitted at the lower power level P2 by $QSTA_1$.

Finally, for efficient bandwidth usage, the granted TxOP holder $QSTA_1$ should transmit at least following (last) frame (s) 206 within the granted TxOP at the higher power level P3 necessary to ensure that BOTH the destination $QSTA_2$ and the HC correctly receive the frame: QoS data frame with the non-final (NF) bit equal to zero, and QoS CF-ACK responding to the QoS CF-Poll frame with NF=0. Such power levels for the last frame(s) are desirable to save bandwidth, particularly when the TxOP holder $QSTA_1$ finishes earlier than the end of the originally granted TxOP.

In order to prevent the HC from prematurely reclaiming the channel, the HC is constrained and may only reclaim the channel in the following situations: when the CCA remains idle for the point coordination inter-frame spacing (PIFS) after the end of the QoS CF-Poll frame; upon reception of a frame from the TxOP holder with NF=0 and a relevant QoS CF-ACK frame if the normal ACK policy is used; and the granted TxOP expires. The HC may NOT, however, unconditionally reclaim the channel after merely sensing the medium idle for DIFS or PIFS.

In addition, during a TxOP, ONLY the TxOP holder is responsible for recovery from the absence of an expected reception. The recovery may be performed by: retransmitting the frame; sending a frame to another QSTA; or sending a QoS Null Data frame to the HC with the NF bit equal to 0 (in this manner, the TxOP ends and the HC can reclaim the channel). All other QSTAs, including the HC, shall not initiate channel recovery since they cannot reliably determine if the medium in the QBSS is in use or not.

It should be noted that, while the above discussion relates to arbitrary power levels within a continuum, the transmit power controller for the TxOP holder may be limited to selecting from among a number of discrete power levels, choosing the best power level (and data rate) available.

Figure 3:
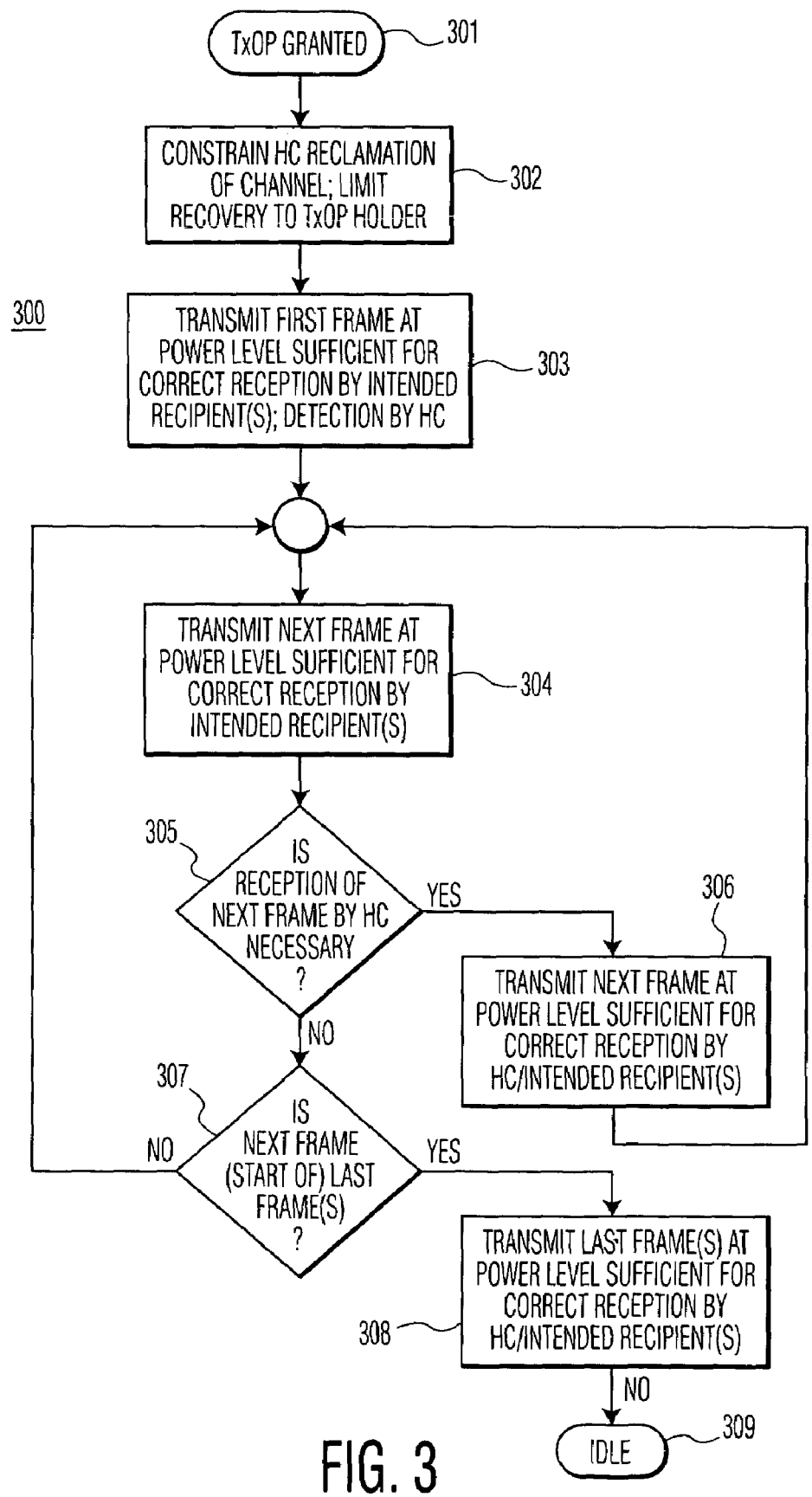
FIG. 3 is a high level flowchart for a process of transmit power control during station-to-station communications under hybrid coordination function operation according to one embodiment of the present invention.

FIG. 3 is a high level flowchart for a process of transmit power control during station-to-station communications under hybrid coordination function operation according to one embodiment of the present invention. The process 300, which is performed by the TxOP holder, begins with a TxOP being granted for QSTA-to-QSTA communication (step 301). The HC is precluded from reclaiming the channel except under pre-defined conditions excluding inactivity (unconditionally), and recovery is limited to the TxOP holder (step 302). The first frame from the TxOP holder is transmitted at a power level (and data rate) sufficient to ensure correct reception by the intended recipient (or recipients for multi-casts) and being at least detection by the HC (step 303).

The next frame transmitted by the TxOP holder is transmitted at a power level (and data rate) that is merely sufficient to ensure correct reception by intended recipient(s) (step 304), regardless of reception or even detection by the HC. A determination is then made of whether the next frame should be received by the HC (step 305), such as a TC queue size change, or TxOP duration change. If so, the next frame is transmitted at a power level sufficient to ensure reception by the HC as well as the intended recipient(s) (step 306).

If reception of the next frame by the HC is not necessary, a determination is made of whether the next frame is the last frame, or the start of the last frames (step 307). If not, the next frame is transmitted at a power level merely sufficient to ensure correct reception by the intended recipient(s) (step 304). If so, however, the last frame(s) are transmitted at a power level sufficient to ensure reception by both the intended recipient(s) and the HC (step 308). The process then becomes idle (step 309) until another TxOP is granted.

The above description relates solely to the TxOP holder selectively adapting power. However, in QSTA-to-QSTA communications, the recipients need to respond with protocol frames, such as QoS CF-ACK. The same rules for selectively transmitting a lower power levels apply to the other station(s) within a QSTA-to-QSTA communication.

Figure 4:
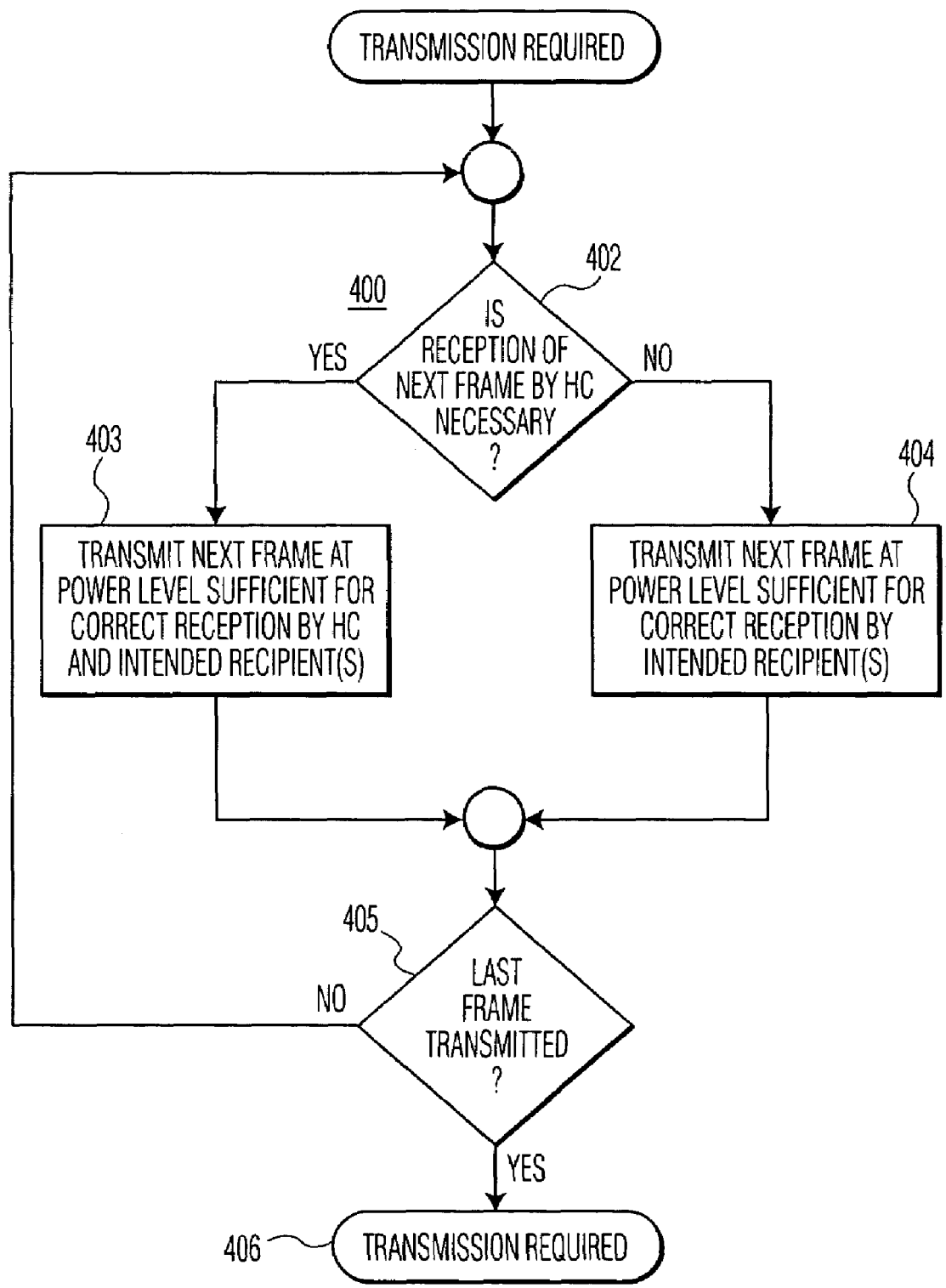
FIG. 4 is a high level flowchart for a process of transmit power control during station-to-station communications under hybrid coordination function operation according to one embodiment of the present invention.

FIG. 4 is a high level flowchart for a process of transmit power control during station-to-station communications under hybrid coordination function operation according to one embodiment of the present invention. Since the QoS CF-ACK may be employed to update the TC queue status, adherence by the other stations involved in the station-to-station communication to the transmit control rules defined above is equally important. The process 400, implemented within the other stations to the station-to-station communication, begins the necessity for transmission of a protocol frame by a non-TxOP holder involved in a station-to-station communication arising (step 401). A determination is made, on a frame-by-frame basis, of whether the next frame to be transmitted must be heard by the HC as well as the intended recipients (step 402). If so, the frame is transmitted at a power level sufficient for correct reception by the HC and the intended recipients (step 403); otherwise, the frame is transmitted at a power level merely sufficient to ensure correct reception by the intended recipients (step 404), without regard to whether the frame is received or detected by the HC. A determination is then made regarding whether the last required frame has been transmitted (step 405), with the process becoming idle (step 406) in that event.

The present invention improves the performance of transmit power control under hybrid coordination function operation. With the new rules defined, the hybrid coordination controller need only detect the first frame after the contention free polling, after which the transmission opportunity holder may transmit at the lowest power and highest data rate possible for correct reception by the destination enhanced station, without consideration of whether the hybrid coordination controller is detecting the frames, which can be of substantial benefit in direct enhanced station to enhanced station communications. Transmit power control is thus employed in an efficient manner while maintaining correct operation of a quality-of-service supporting basic service set network.

It is important to note that while the present invention has been described in the context of a fully functional system, those skilled in the art will appreciate that at least portions of the mechanism of the present invention are capable of being distributed in the form of a machine usable medium containing instructions in a variety of forms, and that the present invention applies equally regardless of the particular type of signal bearing medium utilized to actually carry out the distribution. Examples of machine usable mediums include: nonvolatile, hard-coded type mediums such as read only memories (ROMs) or erasable, electrically programmable read only memories (EEPROMs), recordable type mediums such as floppy disks, hard disk drives and compact disc read only memories (CD-ROMs) or digital versatile discs (DVDs), and transmission type mediums such as digital and analog communication links.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A portion of a wireless communications system comprising:
   a first station selectively capable of station-to-station communication with one or more other stations, the first station operable to control transmit power,
   wherein the first station is adapted to transmit a first frame and a last frame for a station-to-station communication with the one or more other stations at a power level sufficient for both correct reception of the first and last frames by the one or more other stations and at least detection of the first and last frames by a hybrid coordination function controller, and to transmit other frames for the station-to-station communication at a power level merely sufficient for correct reception of the other frames by the one or more other stations, regardless of reception or detection of the other frames by the hybrid coordination function controller.

2. The portion of a wireless communications system according to claim 1, wherein the first station is adapted to selectively transmit one or more of the other frames for the station-to-station communication at a power level sufficient for correct reception of the one or more other frames by both the one or more other stations and the hybrid coordination function controller, and wherein the one or more other stations are adapted to selectively transmit selected frames which must be correctly received by the hybrid coordination function controller at a power level sufficient for correct reception of the one or more other frames by the hybrid coordination function controller and any other stations involved with the station-to-station communication.

3. The portion of a wireless communications system according to claim 2, wherein the one or more other frames are selected from the group comprising:

frames changing a traffic category queue size;
frames requesting a change in duration of the station-to-station communication; and
frames requesting an additional station-to-station communication.

4. The portion of a wireless communications system according to claim 1, wherein the first station is operable for station-to-station communication while the hybrid coordination function controller is constrained from reclaiming a channel over which the first, last, and other frames are transmitted based upon failure to detect activity on the channel during the station-to-station communication.

5. The portion of a wireless communications system according to claim 1, wherein the first station is adapted to be the only station capable of initiating recovery from a communication failure during the station-to-station communication.

6. The portion of a wireless communications system according to claim 1, wherein the first station is adapted to transmit the other frames at a data rate merely sufficient for correct reception of the other frames by the one or more other stations, regardless of reception or detection of the other frames by the hybrid coordination function controller.

7. The portion of a wireless communications system according to claim 1, wherein the power level at which the other frames are transmitted is lower than the power level at which the first frame is transmitted.

8. A wireless communications system comprising:
a hybrid coordination function controller; and
stations selectively capable of station-to-station communication, at least a first station among the stations operable to control transmit power,
wherein the first station is adapted to transmit a first frame and a last frame for a station-to-station communication with one or more other stations at a power level sufficient for both correct reception of the first and last frames by the one or more other stations and at least detection of the first and last frames by the hybrid coordination function controller, and to transmit other frames for the station-to-station communication at a power level merely sufficient for correct reception of the other frames by the one or more other stations, regardless of reception or detection of the other frames by the hybrid coordination function controller.

9. The wireless communications system according to claim 8, wherein the first station is adapted to selectively transmit one or more of the other frames for the station-to-station communication at a power level sufficient for correct reception of the one or more other frames by both the one or more other stations and the hybrid coordination function controller, and wherein the one or more other stations are adapted to selectively transmit selected frames which must be correctly received by the hybrid coordination function controller at a power level sufficient for correct reception of the one or more other frames by the hybrid coordination function controller and any other stations involved with the station-to-station communication.

10. The wireless communications system according to claim 9, wherein the one or more frames are selected from the group comprising:

frames changing a traffic category queue size;
frames requesting a change in duration of the station-to-station communication; and
frames requesting an additional station-to-station communication.

11. The wireless communications system according to claim 8, wherein the first station is operable for station-to-station communication while the hybrid coordination function controller is constrained from reclaiming a channel over which the first, last, and other frames are transmitted based upon failure to detect activity on the channel during the station-to-station communication.

12. The wireless communications system according to claim 8, wherein the first station is adapted to be the only station capable of initiating recovery from a communication failure during the station-to-station communication.

13. The wireless communications system according to claim 8, wherein the first station is adapted to transmit the other frames at a data rate merely sufficient for correct reception of the other frames by the one or more other stations, regardless of reception or detection of the other frames by the hybrid coordination function controller.

14. The wireless communications system according to claim 8, wherein the power level at which the other frames are transmitted is lower than the power level at which the first frame is transmitted.

15. A method of wireless communications comprising:
transmitting a first frame and a last frame for a station-to-station communication from a first station to one or more other stations at a first power level sufficient for both correct reception of the first and last frames by the one or more other stations and at least detection of the first and last frames by a hybrid coordination function controller; and
transmitting other frames for the station-to-station communication at a second power level merely sufficient for correct reception of the other frames by the one or more other stations, regardless of reception or detection of the other frames by the hybrid coordination function controller,
wherein the second power level is lower than the first power level.

16. The method according to claim 15, further comprising:
transmitting one or more other frames for the station-to-station communication at a third power level sufficient for correct reception of the one or more other frames by both the one or more other stations and the hybrid coordination function controller; and
transmitting, from one of the one or more other stations, one or more other frames responsive to frames transmitted by the first station which must be correctly received by the hybrid coordination function controller at a power level sufficient for correct reception of the one or more other responsive frames by the hybrid coordination function controller and the first station.

17. The method according to claim 16, wherein the one or more other frames are selected from the group comprising:
   frames changing a traffic category queue size;
   frames requesting a change in duration of the station-to-station communication; and
   frames requesting an additional station-to-station communication.

18. The method according to claim 15, further comprising: constraining the hybrid coordination function controller from reclaiming a channel over which the first, last, and other frames are transmitted based upon failure to detect activity on the channel during the station-to-station communication.

19. The method according to claim 15, wherein the first station is the only station capable of initiating recovery from a communication failure during the station-to-station communication.

20. The method according to claim 15, further comprising:
   transmitting the other frames at a data rate merely sufficient for correct reception of the other frames by the one or more other stations, regardless of reception or detection of the other frames by the hybrid coordination function controller.

21. A station-to-station communication, comprising:
   a first frame and a last frame from a first station to one or more other stations at a first power level sufficient for both correct reception of the first frame by the one or more other stations and at least detection of the first frame by a hybrid coordination function controller; and
   other frames following the first frame at a second power level merely sufficient for correct reception of the subsequent frames by the one or more other stations, regardless of reception or detection of the other frames by the hybrid coordination function controller,
   wherein the second power level is lower than the first power level.

* * * * *